Patented June 25, 1946

2,402,823

UNITED STATES PATENT OFFICE 2,402,823

SURFACE-ACTIVE AGENTS

Lucas P. Kyrides, St. Louis, Mo., assignor to Monsanto Chemical Company, a corporation of Delaware No Drawing. Application April 9, 1943,
Serial No. 482,505

4 Claims. (Cl. 260—481)

This invention relates to new and improved surface-active agents and more particularly to agents possessing improved spreading properties prepared from the diesters of aliphatic dicarboxylic acids with olefinic monohydric alcohols or from the mixed esters of such acids with an olefinic monohydric alcohol and a saturated monohydric alcohol.

In U. S. Patent No. 2,176,423 there is described the preparation of certain esters of saturated aliphatic dicarboxylic acids containing a sulfo group as a substituent in the acyl portion of the molecule, and there is proposed the use of such esters as wetting agents, detergents, emulsifying agents and the like. I have now found that extraordinary surface-activity resides in sulfonation and sulfation products of certain unsaturated esters of saturated and unsaturated dicarboxylic acids.

My new compounds may be represented by the following general formula:

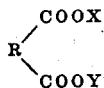

where R is a bivalent group such as —(CH$_2$)$_n$—, where $n=1$ to 4;

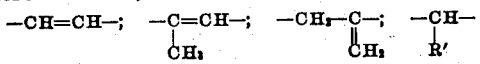

and the sulfo derivatives thereof, where R' may be an aliphatic or olefinic substituent such as C$_n$H$_{2n+2}$ and C$_n$H$_{2n}$, and $n$ is an integer having a value of 1 to 12.

X is an esterifying group, i. e., an aliphatic carbon chain of from 3 to 12 carbon atoms containing at least one of the groups:

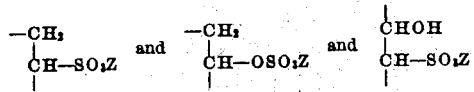

where Z is hydrogen or a metal such as Na, K, or NH$_4$, Y may be the same as X or may be an unsubstituted aliphatic carbon chain of from 3 to 12 carbon atoms.

As a preferred embodiment of such general groups, I have found that the unsaturated alcohol esters of succinic acid or the mixed saturated and unsaturated alcohol esters of succinic acid may be advantageously sulfonated. Or I may sulfonate the alkyl or alkylene derivatives thereof, particularly the polyisobutenyl and especially the di- or triisobutenyl derivatives.

Such succinic acid esters of the preferred group may have the structure:

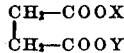

or, in case an alkenyl succinic acid is employed the structure:

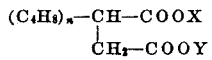

where $n$ has a value of 2 or 3, and X and Y have the significance described above.

In certain cases the sulfo succinic acids described in U. S. Patent No. 2,176,423 may be employed as starting materials for the preparation of the present compounds.

The present compounds are obtainable by the reaction of a sulfonating agent, for example, chlorosulfonic acid, or sulfuric acid on the unsaturated di-esters of dicarboxylic acids or their alkyl or alkylene derivatives with olefinic monohydric alcohols or on the mixed esters of such acids with a saturated and an olefinic monohydric alcohol.

When the sulfonating agents herein employed are caused to react with olefinic ester groups, sulfo alkyl ester groups are formed. Such ester groups may contain one of the following groups:

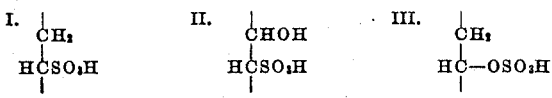

Groups I and III are usually formed by treating the ester with sulfuric acid, while group II is formed by treating the ester with chlorsulfonic acid at a low temperature. As examples of suitable esters I may mention octyl allyl succinate, allyl lauryl triisobutenylsuccinate, diallyl triisobutenylsuccinate, etc. I have found that when such esters are caused to react with an agent of sulfonation, for example, chlorosulfonic acid or sulfuric acid, sulfonation does not occur at the acyl portion of the molecule. Instead, there is introduced a sulfonic acid group, a hydroxy sulfonic acid group or a sulfate group into the alcoholic residue. Generally the hydroxy sulfonic group will predominate, although other sulfo groups may also be formed. The presence of a sulfate or sulfonic acid group in the alcoholic portion of the ester apparently confers extraordinary capillary-active properties to the ester, the present compounds being characterized by a pronounced surface-activity, which property, particularly in respect to the spreading coefficient, indicates the superior usefulness of the present products in the field of surface-active agents. The esters of the present invention may also be obtained by saponifying a saturated alcohol diester of a dicarboxylic acid as described in my copending application Serial No. 432,997, dated March 2, 1942. The mono-ester so produced is then esterified with an olefinic alcohol to produce a mixed saturated unsaturated diester of the dicarboxylic acid.

For the preparation of the present sulfur-containing esters of aliphatic dicarboxylic acids, I prefer to proceed as follows: To a chilled solution of an ester in a diluent or solvent, for example, carbon tetrachloride, I add an approximately molar equivalent of chlorosulfonic acid. I then allow the reaction mixture to stand for a period of from a few hours to one day at a temperature of from ice-bath temperatures to, say, 75° C., the reaction time and reaction temperature depending upon the nature of the ester employed. At the end of this time I dilute the reaction mixture, for example, with benzene, neutralize the diluted mixture, separate any inorganic salt formed in the neutralizing step, and then recover the sulfur-containing ester by distilling off the diluent, drum-drying, etc.

My sulfur-containing esters are particularly useful as agents that facilitate the spreading of water on an oily surface. The spreading coefficient is a measure of the spreading power of a solution of a surface-active agent on an oily surface. This coefficient is an algebraic value obtained from the surface and interfacial tensions and calculated as follows:

$$\frac{\text{Surface tension}}{\text{of oil}} - \left(\frac{\text{Surface tension}}{\text{of solution}} + \frac{\text{Interfacial tension}}{\text{of solution and oil}}\right) = \frac{\text{Spreading}}{\text{coefficient}}$$

It has been demonstrated by Cupples (Ind. Eng. Chem. 27, 1219 (1935)) that solutions of surface-active materials possessing the highest algebraic value, i. e., the highest spreading coefficient, tend best to spread on oily surfaces. Whereas the spreading coefficient of many of the previously known surface-active agents at 1% concentrations generally varies from, say, −3.0 to −50.0, the spreading coefficients of the present sulfur-containing esters have a positive value, that of the sulfur-containing ester prepared from allyl hexyl triisobutenylsuccinate, for example, being +6.8. Materials possessing high spreading coefficients are especially useful in the preparation of emulsions, metal-cleaning agents, insecticides, etc. For example, insects are covered with an oily layer and contact insecticides must wet this film to be effective. Likewise, insecticide sprays must wet foliage, which often carries a coating of a waxy nature.

Many applications require that the surface-active agent does not react with certain metallic ions. I test the stability of my surface-active agents to calcium, magnesium, copper, zinc and nickel by employing the following procedure: I measure 10 mls. of a 1% solution of the agent into a 25 ml. Erlenmeyer flask. I then prepare a 1% solution of the metallic salt and add said solution drop-wise to the almost boiling solution of the material to be tested. The end-point is taken when it is no longer possible to see through a transverse layer of the boiling solution, or when 100 mls. of the metallic salt solution has been added. Results are expressed in milligrams of metallic salt required in the test. The present surface-active agents show no turbidity even when 100 mls., the maximum amount of metallic salt employed, are added to the boiling solution of the agent as above described.

The invention is illustrated, but not limited, by the following examples:

Example 1

I rapidly add 23.3 g. (0.20 mol) of chlorosulfonic acid to a solution of 46.8 g. (0.173 mol) of octyl allyl succinate in 150 g. of carbon tetrachloride. I then reflux the resulting mixture for 4 hours on the water-bath, during which time hydrogen chloride is evolved copiously. At the end of this time I neutralize the reaction mixture with sodium carbonate, take up the product with benzene, and then remove the excess of sodium carbonate, $Na_2SO_4$, and NaCl by filtering off the benzene solution. Upon separation of the benzene by distillation, addition of water to the residue, and drum-drying of the resulting aqueous solution, I obtain 60.8 g. of the sodium salt of hydroxy sulfonated octyl allyl succinate.

Instead of treating the ester with chlorosulfonic acid, I may suspend it in carbon tetrachloride, add about 3 times its weight of concentrated $H_2SO_4$ and heat at the boiling point of carbon tetrachloride. The sulfo ester is then neutralized with sodium carbonate, dissolved in alcohol and filtered to free it of inorganic salts. The product is then recovered as above.

I evaluate the product with respect to surface tension, interfacial tension and spreading coefficient by the procedures described above and obtain the following values:

|  | Per cent concentration | | |
| --- | --- | --- | --- |
|  | 1.0 | 0.25 | 0.0625 |
| Surface tension | 30.6 | 31.2 | 36.9 dynes/cm. |
| Interfacial tension | 1.4 | 1.7 | 9.2 dynes/cm. |
| Spreading coefficient | +2.5 | +1.6 | −11.6. |

When tested for stability to metallic ions according to the method herein described I find that the aqueous solutions of the present product are stable to 100 mls., respectively, of the salts of the following metals: calcium, magnesium, copper, barium, zinc, or nickel.

Example 2

I dissolve 30.6 g. (0.75 mol) of mono-allyl mono-n-hexyl triisobutenylsuccinate in 150 g. of carbon tetrachloride and then add to the resulting solution 5.3 g. (0.8 mol) of chlorosulfonic acid. I stir the reaction mixture for a period of 5 hours at a temperature of from 50° C. to 60° C. and then neutralize it with sodium carbonate. I then take up the product with benzene, filter the resulting solution in order to remove inorganic salts, and subsequently remove the benzene by distillation in vacuo. In this manner I obtain 34.0 g. of the sodium salt of hydroxy sulfonated allyl n-hexyl triisobutenylsuccinate.

I evaluate the product with respect to surface tension, interfacial tension and spreading coefficient by the procedures herein described and obtain the following values:

|  | Per cent concentration | | |
| --- | --- | --- | --- |
|  | 1.0 | 0.25 | 0.0625 |
| Surface tension | 27.2 | 27.9 | 28.2 dynes/cm. |
| Interfacial tension | 0.5 | 1.4 | 2.4 dynes/cm. |
| Spreading coefficient | +6.8 | +5.2 | +3.9. |

Example 3

I rapidly add, drop-wise, 13 g. (0.11 mol) of chlorosulfonic acid to a mixture consisting of 36.4 g. (0.1 mol) of diallyl triisobutylenesuccinate and 200 g. of carbon tetrachloride. I then warm the reaction mixture to a temperature of 50° C. and maintain it at a temperature of from 50° C. to 60° C. for a time of 5 hours, during which time hydrogen chloride is liberated freely. The product was neutralized with sodium carbonate, taken up in benzene, filtered to remove inorganic salts and drum-dried. I obtain 42 grams of drum-dried product which is the di(hydroxy sodium sulfo propyl) triisobutenylsuccinate.

I evaluate the product with respect to surface tension, interfacial tension and spreading coefficient by the procedures described above and obtain the following values:

|  | Per cent concentration | | |
| --- | --- | --- | --- |
|  | 1.0 | 0.25 | 0.0625 |
| Surface tension | 29.6 | 30.7 | 35.2 dynes/cm. |
| Interfacial tension | 1.7 | 3.2 | 7.4 dynes/cm. |
| Spreading coefficient | +3.2 | +0.6 | −8.1. |

When tested for stability to metallic ions according to the method herein described I find aqueous solutions of the present product are stable to 100 mls., respectively, of the salts of the following metals: calcium, magnesium, copper, lead, zinc and nickel.

Example 4

To a solution of 34.3 g. (0.069 mol) of lauryl allyl triisobutylenesuccinate in 200 g. of carbon tetrachloride I add, one portion, 8.8 g. (0.075 mol) of chlorosulfonic acid. I then heat the resulting reaction mixture, with stirring, for 5 hours at a temperature of from 50° C. to 60° C. At the end of this time I dissolve the product in benzene, neutralize the resulting solution with sodium carbonate and then filter to remove inorganic salts. Upon separation of the benzene by distillation I obtain 38.0 g. of the sodium salt of the hydroxy sulfonated allyl lauryl triisobutylenesuccinate.

I evaluate the product with respect to surface tension, interfacial tension and spreading coefficient by the procedures herein described and obtain the following values:

Example 5

To a solution consisting of 65.0 g. (0.13 mol) of lauryl allyl succinate in 150 cc. of carbon tetrachloride I rapidly add 29.0 g. (0.25 mol) of chlorosulfonic acid. I then heat the reaction mixture on the water bath for a time of 6 hours at a temperature of from 50° C. to 60° C. At the end of this time I dilute the reaction mixture with benzene, neutralize it with sodium bicarbonate, and then add alcohol. Upon filtration of the whole, in order to remove sodium sulfate, and other inorganic salts, and drum-drying of the resulting filtrate, I obtain 70.0 g. (83.5% theoretical yield) of the sodium salt of the hydroxy sulfo allyl lauryl succinate.

I evaluate the product with respect to surface tension, interfacial tension and spreading coefficient by the procedures herein described and obtain the following values:

|  | Per cent concentration | | |
| --- | --- | --- | --- |
|  | 1.0 | 0.25 | 0.0625 |
| Surface tension | 31.4 | 32.9 | 36.0 dynes/cm. |
| Interfacial tension | 5.6 | 9.8 | 13.1 dynes/cm. |
| Spreading coefficient | −2.5 | −8.2 | −14.6. |

When tested for stability to metallic ions according to the method herein described, I find that the aqueous solutions of the present product are stable to 100 mls., respectively, of the salts of the following metals: calcium, magnesium, copper, zinc and nickel.

Example 6

220 grams (1 mol) of the mono-sodium salt of sulfo succinic acid, 1.1 mols of a $C_8$ olefinic alcohol such as allyl methyl propyl carbinol ($CH_2=CHCH_2C(CH_3)(C_3H_7)OH$) and 500 cc. of toluene are refluxed with stirring in an apparatus fitted with a trap for the separation of water. Refluxing is continued until water separation stops. (Usually 75% to 85% of the theoretical quantity of water separates.) The addition of a small amount of a strong mineral acid such as sulfuric acid will speed up esterification. Toluene is then removed under vacuum and the residue is dissolved in the minimum quantity of water and then extracted with carbon tetrachloride to remove any unreacted alcohol.

The product isolated as the sodium salt of the diester of sulfo succinic acid may be further sulfonated by suspending in ether and treating with an equal weight of chlorosulfonic acid and then isolating the compound as described in Example 1.

Instead of treating the ester with chlorosulfonic acid, I may suspend it in carbon tetrachloride and add about 3 times its weight of concentrated $H_2SO_4$, then boil it at the boiling point of carbon tetrachloride. The sulfo ester formed is then neutralized with sodium carbonate, dissolved in alcohol and filtered to free it of inorganic salts. The product is then recovered as above.

As other esters which may be employed in the preparation of the surface-active agents of the present invention may be mentioned the diesters of succinic acid or the alkyl or alkylene derivatives thereof with allyl alcohol, allyl carbinol, ethyl vinyl carbinol, propyl vinyl carbinol, heptene-1-ol-2, allyl diethyl carbinol, methyl allyl butyl carbinol, allyl hexyl carbinol, methyl allyl hexyl carbinol, or ethyl allyl hexyl carbinol; mixed esters of said acids with one of the aforementioned unsaturated alcohols and a saturated alcohol such as methanol, ethanol, propanol, isopropanol, butanol, octanol, lauryl alcohol, etc.; the diesters of other aliphatic dicarboxylic acids, for example, adipic acid, maleic acid, malonic acid, glutaric acid, itaconic, citraconic acid, etc. with olefinic alcohols; and the mixed esters of such acids with an olefinic alcohol and an aliphatic saturated alcohol.

Inasmuch as the above specification comprises preferred embodiments of the invention it is to be understood that the invention is not limited thereto and that changes and modifications may be made therein without departing substantially from the invention, which is defined in the appended claims.

What I claim is:

1. Diesters of triisobutenyl succinic acid, one esterifying group of said diester being the hydroxy sodium sulfo propyl group and the other esterifying group being an alkyl radical having from 6 to 12 carbon atoms.

2. n-Hexyl hydroxy sodium sulfo propyl triisobutenyl succinate.

3. Octyl hydroxy sodium sulfo-propyl triisobutenyl succinate.

4. Lauryl hydroxy sodium sulfo propyl triisobutenyl succinate.

LUCAS P. KYRIDES.